(12) United States Patent
Walter

(10) Patent No.: US 8,494,375 B2
(45) Date of Patent: Jul. 23, 2013

(54) HIGH SPEED COMMUNICATION

(75) Inventor: Gabriel Walter, Champaign, IL (US)

(73) Assignee: Quantum Electro Opto Systems Sdn. Bhd., Melaka (MY)

( * ) Notice: Subject to any disclaimer, the term of this patent is extended or adjusted under 35 U.S.C. 154(b) by 290 days.

(21) Appl. No.: 12/927,159

(22) Filed: Nov. 8, 2010

(65) Prior Publication Data

US 2011/0150487 A1    Jun. 23, 2011

Related U.S. Application Data

(60) Provisional application No. 61/280,822, filed on Nov. 9, 2009, provisional application No. 61/403,750, filed on Sep. 21, 2010.

(51) Int. Cl.
*H04B 10/00* (2006.01)
(52) U.S. Cl.
USPC .......................... 398/183; 398/188; 398/201
(58) Field of Classification Search
USPC ................. 398/140–172, 182–201
See application file for complete search history.

(56) References Cited

U.S. PATENT DOCUMENTS

| | | | |
|---|---|---|---|
| 4,176,367 A | 11/1979 | Uematsu | 357/19 |
| 4,580,293 A * | 4/1986 | Reichle | 398/182 |
| 5,796,714 A | 8/1998 | Chino et al. | 372/50 |
| 6,728,494 B2 * | 4/2004 | Numata et al. | 398/182 |
| 7,043,161 B2 * | 5/2006 | Jung | 398/139 |
| 7,091,082 B2 | 8/2006 | Feng et al. | 438/235 |
| 7,280,769 B2 * | 10/2007 | Astrauskas | 398/202 |
| 7,286,583 B2 | 10/2007 | Feng et al. | 372/30 |
| 7,354,780 B2 | 4/2008 | Feng et al. | 257/292 |
| 7,535,034 B2 | 5/2009 | Walter et al. | 372/43 |
| 7,711,015 B2 | 5/2010 | Holonyak et al. | 372/11 |
| 7,813,396 B2 | 10/2010 | Feng et al. | 372/43.01 |
| 2001/0050934 A1 | 12/2001 | Choquette et al. | 372/43 |
| 2004/0091270 A1 | 5/2004 | Choi et al. | 398/130 |
| 2005/0040387 A1 | 2/2005 | Feng et al. | 257/14 |

(Continued)

FOREIGN PATENT DOCUMENTS

JP        61270885        12/1986

OTHER PUBLICATIONS

Light-Emitting Transistor: Light Emission From InGaP/GaAs Heterojunction Bipolar Transistors, M. Feng, N. Holonyak, Jr., and W. Hafez, Appl. Phys. Lett. 84, 151 (2004).

(Continued)

*Primary Examiner* — Nathan Curs
*Assistant Examiner* — Tanya Ngo
(74) *Attorney, Agent, or Firm* — Martin Novack

(57) ABSTRACT

The disclosure has application for use in establishing a communication link between a first location and a second location, the first location having an electrical driver circuit that receives input data to be communicated, and the second location having an electrical receiver circuit for producing output data representative of the input data. The method includes the following steps: providing a tilted charge light emitting device at the first location and coupled with the driver circuit such that the light produced by the tilted charge light-emitting device is a function of the input data; providing an optical fiber between the first and second locations; coupling light from the tilted charge light emitting device into the optical fiber; and providing, at the second location, a photodetector coupled with the optical fiber and with the receiver circuit; whereby electrical signals representative of the input data are output from the receiver circuit.

21 Claims, 7 Drawing Sheets

U.S. PATENT DOCUMENTS

| | | | |
|---|---|---|---|
| 2005/0040432 A1* | 2/2005 | Feng et al. | 257/198 |
| 2005/0054172 A1* | 3/2005 | Feng et al. | 438/313 |
| 2006/0093010 A1 | 5/2006 | Sekiya et al. | 372/99 |
| 2007/0065160 A1* | 3/2007 | Shinohara | 398/182 |
| 2008/0089368 A1 | 4/2008 | Feng et al. | 372/25 |
| 2008/0205461 A1 | 8/2008 | Henrichs | 372/29.023 |
| 2008/0240173 A1* | 10/2008 | Holonyak et al. | 372/9 |
| 2009/0134939 A1 | 5/2009 | Feng et al. | 327/581 |
| 2010/0034228 A1 | 2/2010 | Holonyak et al. | 374/45 |
| 2010/0073086 A1 | 3/2010 | Holonyak, Jr. et al. | 330/149 |
| 2010/0103971 A1 | 4/2010 | Then et al. | 372/45.01 |
| 2010/0202483 A1 | 8/2010 | Walter et al. | 372/45.01 |
| 2010/0202484 A1 | 8/2010 | Holonyak et al. | 372/45.01 |
| 2010/0272140 A1 | 10/2010 | Walter et al. | 372/38.02 |
| 2010/0289427 A1 | 11/2010 | Walter et al. | 315/219 |
| 2010/0315018 A1 | 12/2010 | Then et al. | 315/291 |
| 2011/0150487 A1* | 6/2011 | Walter | 398/115 |

OTHER PUBLICATIONS

Quantum-Well-Base Heterojunction Bipolar Light-Emitting Transistor, M. Feng, N. Holonyak, Jr., and R. Chan, Appl. Phys. Lett. 84, 1952 (2004).

Type-II GaAsSb/InP Heterojunction Bipolar Light-Emitting Transistor, M. Feng, N. Holonyak, Jr., B. Chu-Kung, G. Walter, and R. Chan, Appl. Phys. Lett. 84, 4792 (2004).

Laser Operation of a Heterojunction Bipolar Light-Emitting Transistor, G. Walter, N. Holonyak, Jr., M. Feng, and R. Chan, Appl. Phys. Lett. 85, 4768 (2004).

Microwave Operation and Modulation of a Transistor Laser, R. Chan, M. Feng, N. Holonyak, Jr., and G. Walter, Appl. Phys. Lett. 86, 131114 (2005).

Room Temperature Continuous Wave Operation of a Heterojunction Bipolar Transistor Laser, M. Feng, N. Holonyak, Jr., G. Walter, and R. Chan, Appl. Phys. Lett. 87, 131103 (2005).

Visible Spectrum Light-Emitting Transistors, F. Dixon, R. Chan, G. Walter, N. Holonyak, Jr., M. Feng, X. B. Zhang, J. H. Ryou, and R. D. Dupuis, Appl. Phys. Lett. 88, 012108 (2006).

The Transistor Laser, N. Holonyak, M Feng, Spectrum, IEEE vol. 43, Issue 2, Feb. 2006.

Signal Mixing in a Multiple Input Transistor Laser Near Threshold, M. Feng, N. Holonyak, Jr., R. Chan, A. James, and G. Walter, Appl. Phys. Lett. 88, 063509 (2006).

Collector Current Map of Gain and Stimulated Recombination on the Base Quantum Well Transitions of a Transistor Laser, R. Chan , N. Holonyak, Jr. , A. James , G. Walter, Appl. Phys. Lett. 88, 143508 (2006).

Collector Breakdown in the Heterojunction Bipolar Transistor laser, G. Walter, A. James, N. Holonyak, Jr., M. Feng, and R. Chan, Appl. Physics Lett. 88, 232105 (2006).

High-Speed ($\geq 1$ GHz) Electrical and Optical Adding, Mixing, and Processing of Square-Wave Signals With a Transistor Laser, M. Feng, N. Holonyak, Jr., R. Chan, A. James, and G. Walter, IEEE Photonics Technology Lett., vol. 18, No. 11, Jun. 1, 2006.

Graded-Base InGaN/GaN Heterojunction Bipolar Light-Emitting Transistors, B.F. Chu-Kung, M. Feng, G. Walter, and J. Holonyak, Jr. et al., Appl. Physics Lett. 89, 082108 (2006).

Carrier Lifetime and Modulation Bandwidth of a Quantum Well AlGaAs/InGaP/GaAs/InGaAs Transistor Laser, M. Feng, N. Holonyak, Jr., A. James, K. Cimino, G. Walter, and R. Chan, Appl. Phys. Lett 89, 113504 (2006).

Chirp in a Transistor Laser: Franz-Keldysh Reduction of the Linewidth Enhancement, G. Walter, A. James, N. Holonyak, Jr., and M. Feng, App. Phys. Lett. 90, 091109 (2007).

Photon-Assisted Breakdown, Negative Resistance, and Switching in a Quantum-Well Transistor Laser, A. James, G. Walter, M. Feng, and N. Holonyak, Jr., Appl. Phys. Lett. 90, 152109 (2007).

Franz-Keldysh Photon-Assisted Voltage-Operated Switching of a Transistor Laser, A. James, N. Holonyak, M. Feng, and G. Walter, Photonics Technology Letters, IEEE vol. 19 Issue: 9 (2007).

Experimental Determination of the Effective Minority Carrier Lifetime in the. Operation of a Quantum-Well n-p-n. Heterojunction Bipolar Light-Emitting Transistor of Varying Base Quantum-Well Design and Doping; H.W. Then, M. Feng, N. Holonyak, Jr., and C. H. Wu, Appl. Phys. Lett. 91, 033505 (2007).

Charge Control Analysis of Transistor Laser Operation, M. Feng, N. Holonyak, Jr., H. W. Then, and G. Walter, Appl. Phys. Lett. 91, 053501 (2007).

Optical Bandwidth Enhancement by Operation and Modulation of the First Excited State of a Transistor Laser, H. W. Then, M. Feng, and N. Holonyak, Jr., Appl. Phys. Lett. 91, 183505 (2007).

Modulation of High Current Gain (($\beta$>49) Light-Emitting InGaN/GaN Heterojunction Bipolar Transistors, B. F. Chu-Kung, C. H. Wu, G. Walter, M. Feng, N. Holonyak, Jr., T. Chung, J.-H. Ryou, and R. D. Dupuis, Appl. Phys. Lett. 91, 232114 (2007).

Collector Characteristics and the Differential Optical Gain of a Quantum-Well Transistor Laser, H. W. Then, G. Walter, M. Feng, and N. Holonyak, Jr., Appl. Phys. Lett. 91, 243508 (2007).

InAlGaAs/InP Light-Emitting Transistors Operating Near 1.55 μm, Yound Huang, Xue-Bing Zhang, Jae-Hyun Ryun, Russell D. Dupuis, Forest Dixon, Nick Holonyak, Jr., and Milton Feng., J. Appl. Phys. 103 114505 (2008).

Transistor Laser With Emission Wavelength at 1544 nm, F. Dixon, M. Feng, N. Holonyak, Jr., Yong Huang, X. B. Zhang, J. H. Ryou, and R. D. Dupuis, Appl. Phys. Lett. 93, 021111 (2008).

Optical Bandwidth Enhancement of Heterojunction Bipolar Transistor Laser Operation With an Auxiliary Base Signal, H.W. Then, G. Walter, M. Feng, and N. Holonyak, Jr., Appl. Phys. Lett. 93, 163504 (2008).

Bandwidth Extension by Trade-Off of Electrical and Optical Gain in a Transistor Laser: Three-Terminal Control, H. W. Then, M. Feng, and N. Holonyak, Jr., Appl. Phys. Lett. 94, 013509 (2009).

Tunnel Junction Transistor Laser, M. Feng, N. Holonyak, Jr., H. W. Then, C. H. Wu, and G. Walter, Appl. Phys. Lett. 94, 041118 (2009).

Electrical-Optical Signal Mixing and Multiplication (2 → 22 GHz) With a Tunnel Junction Transistor Laser, H.W. Then, C.H. Wu, G. Walter, M. Feng and N. Holonyak, Jr., Appl. Phys. Lett. 94, 10114 (2009).

Scaling of Light Emitting Transistor for Multigigahertz Optical Bandwidth, C.H. Wu, G. Walter, H.W. Then, M. Feng and N. Holonyak, Jr., Appl. Phys. Lett. 94, 171101 (2009).

Device Performance of Light Emitting Transistors With C-Doped and Zn-Doped Base Layers, Y. Huang, J.-H. Ryou, R.D. Dupuis, F. Dixon, N. Holonyak, Jr., and M. Feng, IPRM '09 IEEE Intl. Conf. May 10-14, 2009.

Tilted-Charge High Speed (7 GHz) Light Emitting Diode, G. Walter, C. H. Wu, H. W. Then, M. Feng, and N. Holonyak, Jr., Appl. Phys. Lett. 94, 231125 (2009).

4.3 GHz Optical Bandwidth Light Emitting Transistor, G. Walter, C. H. Wu, H. W. Then, M. Feng, and N. Holonyak, Jr., Appl. Phys. Lett. 94, 241101 (2009).

Resonance-Free Frequency Response of a Semiconductor Laser, M. Feng, H. W. Then, N. Holonyak, Jr., G. Walter, and A. James, Appl. Phys. Lett. 95, 033509 (2009).

4-GHz Modulation Bandwidth of Integrated 2×2 LED Array, Chao-Hsin Wu; Walter, G.; Han Wui Then; Feng, M.; Holonyak, N.; Photonics Technology Letters, IEEE vol. 21, Issue: 24 (2009).

Physics of Base Charge Dynamics in the Three Port Transistor Laser, H. W. Then, M. Feng, and N. Holonyak, Appl. Phys. Lett. 96, 113509 (2010).

Microwave Circuit Model of the Three-Port Transistor Laser, H. W. Then, M. Feng, and N. Holonyak, J. Appl. Phys. 107, 094509 (2010).

Distributed Feedback Transistor Laser, F. Dixon, M. Feng, and N. Holonyak, Appl. Phys. Lett. 96, 241103 (2010).

Stochastic Base Doping and Quantum-Well Enhancement of Recombination in an n-p-n Light-Emitting Transistor or Transistor Laser, H. W. Then, C. H. Wu, M. Feng, N. Holonyak, and G. Walter, Appl. Phys. Lett. 96, 263505 (2010).

* cited by examiner

HIGH SPEED COMMUNICATION

PRIORITY CLAIMS

Priority is claimed from U.S. Provisional Patent Application No. 61/280,822, filed Nov. 9, 2009, and from U.S. Provisional Patent Application No. 61/403,750, filed Sep. 21, 2010, and both of said Provisional Applications are incorporated herein by reference.

FIELD OF THE INVENTION

This invention relates to the field of data communication links, and also to improvement of existing so-called copper communication links, and to improved electro-optical communication links and techniques, and also to improved electro-optical differential signaling techniques.

BACKGROUND OF THE INVENTION

Cable links commonly serve the functions of transmitting electrical power and transmitting electrical signals. When used to transmit signals; the cable links are called data interconnects. When the cable link media is made of an electrically conductive material, it is conventionally called a copper data interconnect, or copper link, whether the metal is strictly copper, or another conductor such as aluminum or an alloy. This convention will be used herein.

Copper cables used in copper links are intrinsically lossy media wherein the signal's higher frequency components are attenuated at higher rates (dB/m) than low frequency components. Attenuation can be reduced, but not eliminated, by using larger gauge wires. Therefore, as the speed of data rate increases to the presently used 3.4 Gbits/s per channel (HDMI), or even 4.8 Gbit/s (for USB 3.0), copper cable wires have become increasingly bulky and expensive, and the overall cable package is unattractive even for transmission distances of less than 5 meters. To compensate for losses in wires, copper transmitter chips have built in pre-emphasis circuitry that amplifies high frequency components of the digital signal before driving the signal over the copper line. On the copper receiver side, a cable equalizer is generally built-in to re-amplify high frequency components (or attenuate low frequency components) of the digital signal. A complete copper link may include the use of either or both pre-emphasis and equalizer.

An example is shown in FIG. 1, in which a transmitter chipset is represented by block 110, a receiver chipset is represented by block 120, and a copper cable 150 connects the transmitter and receiver locations. At the transmitter, input data is received by driver circuitry 112, which operates in conjunction with pre-emphasis circuitry 114 to generate the signal transmitted over cable 150. At the receiver, the received signal is coupled with equalizer 122 and limiting amplifier and driver 124, which produces the output data.

In addition to the limitations and disadvantages already mentioned, the copper link consumes relatively high power, can require expensive EMI shielding, and involves use of substantial amounts of non-recyclable materials.

An optical link can eliminate certain copper link disadvantages, but at a higher initial cost and higher power consumption. The use of fiber cable to directly replace a copper channel requires the addition of an E-O (electrical to optical) transducer and an O-E (optical to electrical) transducer, each of which has to be powered and managed using the existing power sources and control circuitry from the copper transmitter chipset and copper receiver chipset. The E-to-O function for gigabit data transmission via fiber has been traditionally achieved through the use of directly modulated laser diode devices or with external modulation techniques, such as electro absorption modulators or photonic switches. However, these techniques require additional feedback control integrated circuitry (ICs) and additional drivers (optical drivers) that consume substantial power and significantly add to cost. For receiver chipsets where the copper cable equalizer transfer functions are fixed, signal exiting from the OE transducer may need to be re-shaped (i.e attenuation of high frequency component signals) in order to match to the copper cable equalizers.

FIG. 2 shows an example of the FIG. 1 data link in which the copper cable has been replaced by a fiber cable 250 with the typical further required circuitry. The transmitter chipset and receiver chipset correspond to components in FIG. 1 of like reference numerals. In FIG. 2, an electrical-to-optical transducer is represented at 232 and an optical-to-electrical transducer is represented at 262. When the EO transducer comprises a laser diode, or a combination of laser diode and modulator, it requires additional control and driver circuitry, represented at 235. Additionally, because the built-in equalizer of the receiver chipset has a particular transfer function if optimized for losses in copper cable, additional signal re-shaping circuitry (including, for example, a limiting amplifier and/or transimpedance amplifier), represented at 265, may be required to match OE output characteristics to the built-in equalizer. As above-indicated, this additional circuitry is expensive and consumes relatively high power. Therefore, for short distances, (e.g. less than 30 meters), transfer of signal over copper media is generally still preferred due to its relatively lower implementation cost.

It is among the objects of a first aspect of the invention to provide a solution to the problems and limitations associated with converting a copper data link to a data link using an optical cable.

The bulk of high speed transmission based on copper data links or interconnects utilizes differential signaling methods. In differential signaling, two signals, identical in magnitude but exactly 180° out-of-phase, are used in order to maintain signal integrity. Since all data processing and data generation has its roots in integrated circuits, which are electrical devices and therefore generate electrical signals, copper based transmission utilizing differential signaling is the dominant method of data transfer for electrical systems. Existing differential signaling is illustrated in the simplified diagram of FIG. 3. At copper driver 330, the differential signal comprises data signal V+ and data signal V−, and these are coupled over copper transmission line or link 350 which, in this example, also carries ground reference potential.

When trying to establish or extend a high speed data interconnect over relatively long distance, an optical fiber based interconnect utilizing a diode emitter such as a laser, VCSEL, or light emitting diode, may be used to extend the transmission line of the copper interconnect. As indicated previously, the optical high speed data interconnect starts with a copper driver and eventually ends with a copper receiver, since all present data systems originate and terminate from and into electrical processes.

In FIG. 4, a schematic of an existing optical interconnect link extender is illustrated. Shown in the diagram are copper driver 430, equalizer 435, optical driver 440, diode emitter 445, fiber optical waveguide 450, diode detector 455 transimpedance amplifier 460, limiting amplifier 470, and copper receiver 480. The Figure demonstrates that since diode light emitters are single ended devices, only one of the data signals (V1+) is used while the other signal is terminated (wasted), via 50 ohm resistor 439 in this example. The signal V1+ from copper driver 430 is passed though equalizer 435, generating a conditioned output V2+ which is fed into optical driver 440. The optical driver converts the input voltage signal into an equivalent current signal (I1+). This step is necessary since present state of the art VCSELs, lasers and LEDs are operated as current driven devices. The current signal is fed into the diode emitter, generating photon signals. The emitted photon signals can then be coupled into optical waveguide 450 (i.e. fiber) or simply via free space. At the output end of the optical waveguide is diode detector 455 which converts photons into photocurrent (I2+). The photocurrent is coupled to transmpedance amplifier (TIA) 460 which converts the photocurrent into an amplified voltage signal and also converts the single ended signal into a differential signal (V3+ and V3−). The differential signal is fed into limiting amplifier 470 to further amplify the signal (V4+ and V4−). Finally, the amplified differential signal is coupled into a copper receiver, completing the data transmission.

It is among the objects of a further aspect of the invention to provide improvements to high speed electro-optical data interconnects of the type just described, including making them more efficient and less expensive.

SUMMARY OF THE INVENTION

A form of the invention has application for use in establishing a communication link between a first location and a second location, the first location having an electrical driver circuit that receives input data to be communicated, and the second location having an electrical receiver circuit for producing output data representative of the input data. An embodiment of a method is set forth, including the following steps: providing a tilted charge light emitting device at said first location and coupled with said driver circuit such that the light produced by said tilted charge light-emitting device is a function of said input data; providing an optical fiber between said first and second locations; coupling light from said tilted charge light emitting device into said optical fiber; and providing, at said second location, a photodetector coupled with said optical fiber and with said receiver circuit; whereby electrical signals representative of said input data are output from said receiver circuit.

Another embodiment of this form of the invention has application for use in establishing a communication link between a first location and a second location, the first location having a transmitter chipset that receives input data to be communicated, and the second location having a receiver chipset for producing output data representative of the input data. A method is set forth, including the following steps: providing a tilted charge light emitting device at said first location and coupled with said transmitter chipset such that the light produced by said tilted charge light-emitting device is a function of said input data; providing an optical fiber between said first and second locations; coupling light from said tilted charge light emitting device into said optical fiber; and providing, at said second location, a photodetector coupled with said optical fiber and with said receiver; whereby electrical signals representative of said input data are output from said receiver chipset. In an embodiment of this form of the invention, the transmitter chipset includes a driver circuit, and the step of providing a tilted charge light-emitting device coupled with the transmitter chipset comprises directly coupling said tilted charge light emitting device with said driver circuit. In a form of this embodiment, the driver circuit includes an open collector transistor and said step of providing said tilted charge light-emitting device coupled with said driver circuit comprises coupling the collector of said transistor with said tilted charge light-emitting device.

Another embodiment of this form of the invention has application for use in improving a communication link between a first location and a second location, the first location having an electrical driver circuit that receives input data to be communicated, and the second location having an electrical receiver circuit for producing output data representative of said input data, said link being adapted to have an electrically conductive cable coupled between said electrical driver circuit and said electrical receiver circuit. A method is set forth including the following steps: removing said electrically conductive cable; providing a tilted charge light emitting device at said first location and coupled with said driver circuit such that the light produced by said tilted charge light-emitting device is a function of said input data; providing an optical fiber between said first and second locations; coupling light from said tilted charge light emitting device into said optical fiber; and providing, at said second location, a photodetector coupled with said optical fiber and with said receiver circuit; whereby electrical signals representative of said input data are output from said receiver circuit.

In accordance with a further form of the invention, a technique is set forth for high speed communication of input information, including the following steps: producing a pair of phase-opposed electrical signals representative of said input information; providing a three terminal tilted-charge light-emitting device in a common collector configuration; applying one of said phase-opposed signals to a base-collector input of said tilted charge light-emitting device and the other of said phase opposed signals to an emitter-collector input of said tilted charge light-emitting device, to produce an optical signal as a function of both of said phase-opposed signals; communicating said optical signal to a receiving location; and receiving said optical signal at said receiving location and converting said optical signal to an output electrical signal representative of said input information. The optical signal, which is a function of both of said phase-opposed signals, is proportional to the sum of the absolute values of the phase-opposed signals.

An embodiment of this form of the invention further comprises the step of applying first and second equalizer functions to respective ones of said pair of phase-opposed electrical signals before applying said phase-opposed signals to said tilted charge light-emitting device. In this embodiment, the step of applying said first equalizer function includes applying a first type of frequency filtering, and said step of applying said second equalizer function includes applying a second type of frequency filtering that is different than said first type of frequency filtering. The first type of frequency filtering can comprise low pass filtering and said second type of frequency filtering can comprise high pass filtering, and bandwidth enhancement can accordingly be achieved.

Further features and advantages of the invention will become more readily apparent from the following detailed description when taken in conjunction with the accompanying drawings.

DETAILED DESCRIPTION

Figure 1:
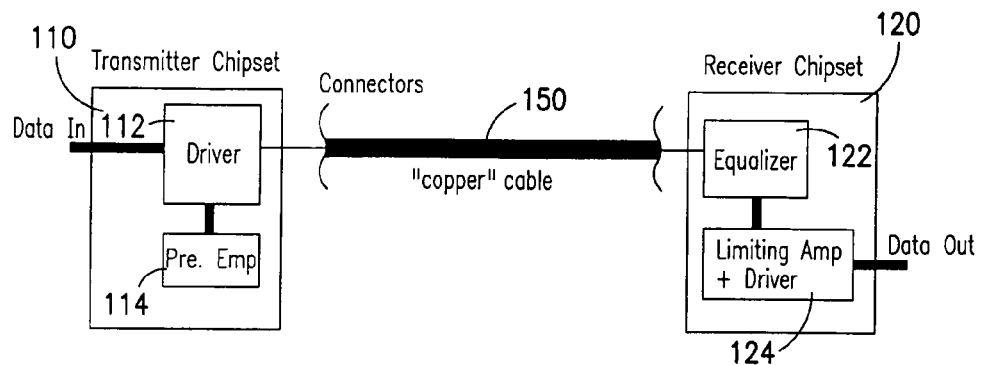
FIG. 1 is a simplified block diagram of a conventional communications link using a copper cable.
Figure 2:
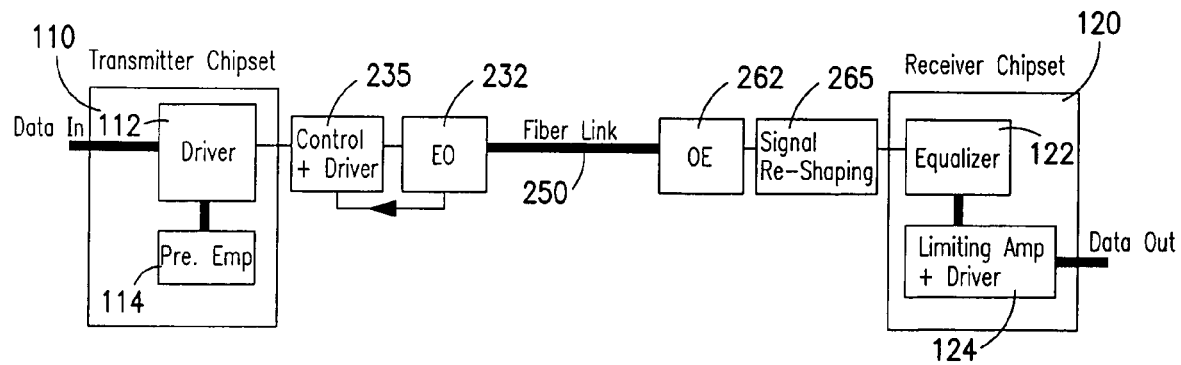
FIG. 2 is a block diagram of a conventional replacement by a fiber optical link, with typical further required circuitry, for the copper link of the FIG. 1 system.
Figure 3:
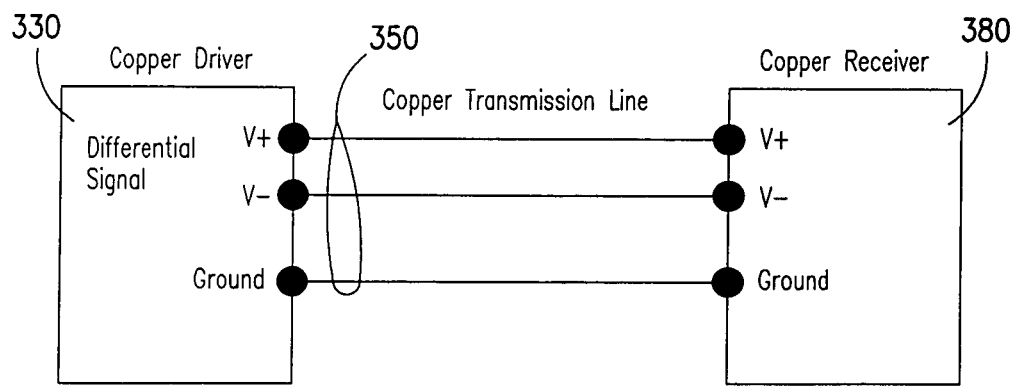
FIG. 3 is a simplified block diagram of a communication system with a copper transmission line, utilizing differential signaling.
Figure 5:
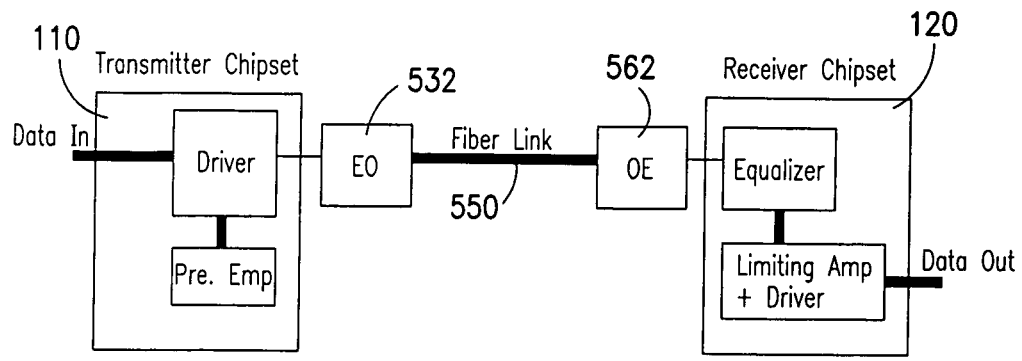
FIG. 5 is a simplified block diagram of an idealized fiber link for replacement into a copper communications link.

FIG. 5 is a diagram of an idealized fiber link for connection between a transmitter chipset 110 (as in FIG. 1) and a receiver chipset 120 (as also in FIG. 1) of the copper link illustrated in FIG. 1, but with the copper cable replaced by fiber link 550, an electrical-to-optical (EO) converter 532, and an optical-to-electrical (OE) converter 562. As described, for example, in conjunction with FIG. 2, however, substantial additional circuitry is presently required in conjunction with the conversion from a copper cable to a fiber link. A challenge hereof was to eliminate the need for some or all of the additional circuitry, and also to have the EO and OE converters powered by existing copper transmitter and copper receiver chipsets (and not externally powered) and be matched directly to existing built-in pre-emphasis and copper equalizers in the existing chipsets without the addition of the costly interface circuitry that is presently needed. Ideally, the EO-fiber cable-OE link should replicate the transfer function of the copper cable (in order to look comparable to the copper driver and receiver signal conditioners), consume lesser or comparable power, and be cost comparable or less than the copper solution.

Embodiments of the present invention employ so-called "tilted charge" light emitting devices. Light-emitting transistors, transistor lasers, and certain two terminal light emitters and lasers, developed during the last few years, are sometimes referred to as "tilted charge" devices, owing to the "tilted" base charge distribution (as can be seen on the device band diagram) which locks the base electron-hole recombination in "competition" with the charge "collection" at the reverse-biased collector or drain junction, thus selecting ("filtering") and allowing only "fast" recombination in the base (assisted by one or more quantum size regions) at an effective lifetime of the order of picoseconds. As used herein, the terms "tilted charge light emitter" or "tilted charge light emitting device", or similar terms, are intended to include such light-emitting transistors, transistor lasers, and certain two terminal light emitters and lasers having the described "tilted" base charge distribution. Reference can be made to U.S. Pat. Nos. 7,091,082, 7,286,583, 7,354,780, 7,535,034 and 7,693,195; U.S. Patent Application Publication Numbers US2005/0040432, US2005/0054172, US2008/0240173, US2009/0134939, US2010/0034228, US2010/0202483, and US2010/0202484; and to PCT International Patent Publication Numbers WO/2005/020287 and WO/2006/093883. Reference can also be made to the following publications: Light-Emitting Transistor: Light Emission From InGaP/GaAs Heterojunction Bipolar Transistors, M. Feng, N. Holonyak, Jr., and W. Hafez, Appl. Phys. Lett. 84, 151 (2004); Quantum-Well-Base Heterojunction Bipolar Light-Emitting Transistor, M. Feng, N. Holonyak, Jr., and R. Chan, Appl. Phys. Lett. 84, 1952 (2004); Type-II GaAsSb/InP Heterojunction Bipolar Light-Emitting Transistor, M. Feng, N. Holonyak, Jr., B. Chu-Kung, G. Walter, and R. Chan, Appl. Phys. Lett. 84, 4792 (2004); Laser Operation Of A Heterojunction Bipolar Light-Emitting Transistor, G. Walter, N. Holonyak, Jr., M. Feng, and R. Chan, Appl. Phys. Lett. 85, 4768 (2004); Microwave Operation And Modulation Of A Transistor Laser, R. Chan, M. Feng, N. Holonyak, Jr., and G. Walter, Appl. Phys. Lett. 86, 131114 (2005); Room Temperature Continuous Wave Operation Of A Heterojunction Bipolar Transistor Laser, M. Feng, N. Holonyak, Jr., G. Walter, and R. Chan, Appl. Phys. Lett. 87, 131103 (2005); Visible Spectrum Light-Emitting Transistors, F. Dixon, R. Chan, G. Walter, N. Holonyak, Jr., M. Feng, X. B. Zhang, J. H. Ryou, and R. D. Dupuis, Appl. Phys. Lett. 88, 012108 (2006); The Transistor Laser, N. Holonyak and M Feng, Spectrum, IEEE Volume 43, Issue 2, February 2006; Signal Mixing In A Multiple Input Transistor Laser Near Threshold, M. Feng, N. Holonyak, Jr., R. Chan, A. James, and G. Walter, Appl. Phys. Lett. 88, 063509 (2006); and Collector Current Map Of Gain And Stimulated Recombination On The Base Quantum Well Transitions Of A Transistor Laser, R. Chan, N. Holonyak, Jr., A. James , and G. Walter, Appl. Phys. Lett. 88, 14508 (2006); Collector Breakdown In The Heterojunction Bipolar Transistor Laser, G. Walter, A. James, N. Holonyak, Jr., M. Feng, and R. Chan, Appl. Phys. Lett. 88, 232105 (2006); High-Speed (/spl ges/1 GHz) Electrical And Optical Adding, Mixing, And Processing Of Square-Wave Signals With A Transistor Laser, M. Feng, N. Holonyak, Jr., R. Chan, A. James, and G. Walter, Photonics Technology Letters, IEEE Volume: 18 Issue: 11 (2006); Graded-Base InGaN/GaN Heterojunction Bipolar Light-Emitting Transistors, B. F. Chu-Kung et al., Appl. Phys. Lett. 89, 082108 (2006); Carrier Lifetime And Modulation Bandwidth Of A Quantum Well AlGaAs/InGaP/GaAs/InGaAs Transistor Laser, M. Feng, N. Holonyak, Jr., A. James, K. Cimino, G. Walter, and R. Chan, Appl. Phys. Lett. 89, 113504 (2006); Chirp In A Transistor Laser, Franz-Keldysh Reduction of The Linewidth Enhancement, G. Walter, A. James, N. Holonyak, Jr., and M. Feng, Appl. Phys. Lett. 90, 091109 (2007); Photon-Assisted Breakdown, Negative Resistance, And Switching In A Quantum-Well Transistor Laser, A. James, G. Walter, M. Feng, and N. Holonyak, Jr., Appl. Phys. Lett. 90, 152109 (2007); Franz-Keldysh Photon-Assisted Voltage-Operated Switching of a Transistor Laser, A. James, N. Holonyak, M. Feng, and G. Walter, Photonics Technology Letters, IEEE Volume: 19 Issue: 9 (2007); Experimental Determination Of The Effective Minority Carrier Lifetime In The Operation Of A Quantum-Well n-p-n Heterojunction Bipolar Light-Emitting Transistor Of Varying Base Quantum-Well Design And Doping, H. W. Then, M. Feng, N. Holonyak, Jr., and C. H. Wu, Appl. Phys. Lett. 91, 033505 (2007); Charge Control Analysis Of Transistor Laser Operation, M. Feng, N. Holonyak, Jr., H. W. Then, and G. Walter, Appl. Phys. Lett. 91, 053501 (2007); Optical Bandwidth Enhancement By Operation And Modulation Of The First Excited State Of A Transistor Laser, H. W. Then, M. Feng, and N. Holonyak, Jr., Appl. Phys. Lett. 91, 183505 (2007); Modulation Of High Current Gain (β>49) Light-Emitting InGaN/GaN Heterojunction Bipolar Transistors, B. F. Chu-Kung, C. H. Wu, G. Walter, M. Feng, N. Holonyak, Jr., T. Chung, J.-H. Ryou, and R. D. Dupuis, Appl. Phys. Lett. 91, 232114 (2007); Collector Characteristics And The Differential Optical Gain Of A Quantum-Well Transistor Laser, H. W. Then, G. Walter, M. Feng, and N. Holonyak, Jr., Appl. Phys. Lett. 91, 243508 (2007); Transistor Laser With Emission Wavelength at 1544 nm, F. Dixon, M. Feng, N. Holonyak, Jr., Yong Huang, X. B. Zhang, J. H. Ryou, and R. D. Dupuis, Appl. Phys. Lett. 93, 021111 (2008); Optical Bandwidth Enhancement Of Heterojunction Bipolar Transistor Laser Operation With An Auxiliary Base Signal, H. W. Then, G. Walter, M. Feng, and N. Holonyak, Jr. Appl. Phys. Lett. 93, 163504 (2008); Bandwidth Extension By Trade-Off Of Electrical And Otical Gain In A Transistor Laser: Three-Terminal Control, H. W. Then, M. Feng, and N. Holonyak, Jr. Appl. Phys. Lett. 94, 013509 (2009); Tunnel Junction Transistor Laser, M. Feng, N. Holonyak, Jr., H. W. Then, C. H. Wu, and G. Walter Appl. Phys. Lett. 94, 041118 (2009); Electrical-Optical Signal Mixing And Multiplication (2 GHz) With A Tunnel Junction Transistor Laser, H. W. Then, C. H. Wu, G. Walter, M. Feng, and N. Holonyak, Jr. Appl. Phys. Lett. 94, 101114 (2009); Scaling Of Light Emitting Transistor For Multigigahertz Optical Bandwidth, C. H. Wu, G. Walter, H. W. Then, M. Feng, and N. Holonyak, Jr. Appl. Phys. Lett. 94, 171101 (2009). Device Performance Of Light Emitting Transistors With C-Doped And Zn-Doped Base Layers, Huang, Y., Ryou, J.-H., Dupuis, R.D., Dixon, F., Holonyak, N., Feng, M., Indium Phosphide & Related Materials, 2009; IPRM '09. IEEE International Conference, 10-14 May 2009, Pages 387-390; Tilted-Charge High Speed (7 GHz) Light Emitting Diode, G. Walter, C. H. Wu, H. W. Then, M. Feng, and N. Holonyak, Jr. Appl. Phys. Lett. 94, 231125 (2009); 4.3 GHz Optical Bandwidth Light Emitting Transistor, G. Walter, C. H. Wu, H. W. Then, M. Feng, and N. Holonyak, Jr. Appl. Phys. Lett. 94, 241101 (2009); and Resonance-Free Frequency Response Of A Semiconductor Laser, M. Feng, H. W. Then, N. Holonyak, Jr., G. Walter, and A. James Appl. Phys. Lett. 95, 033509 (2009).

Figure 6:
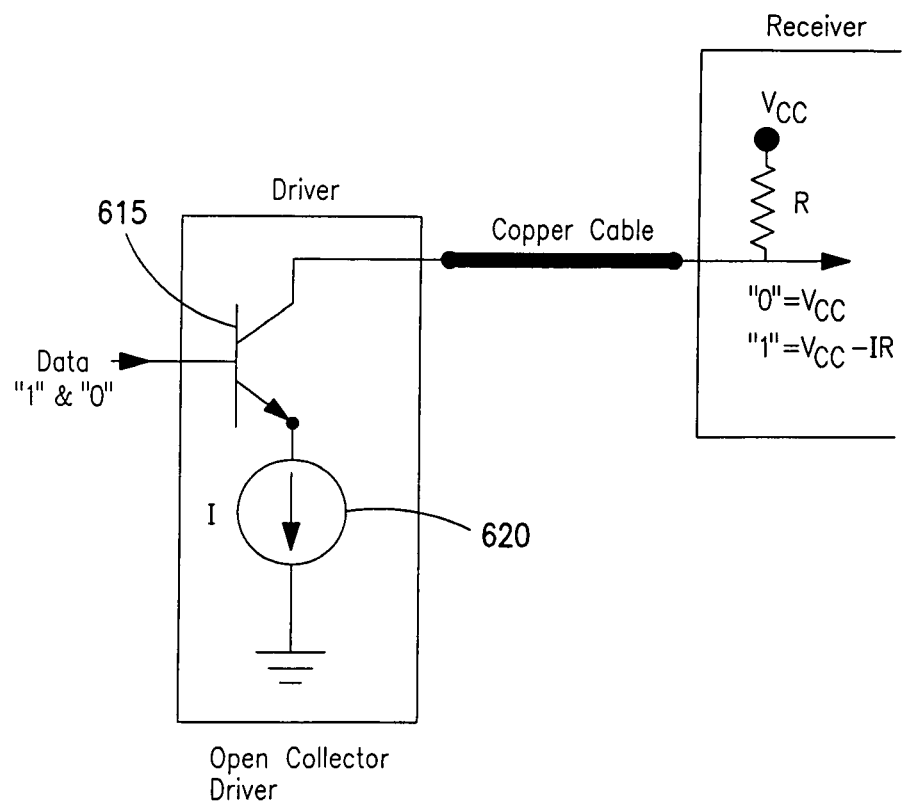
FIG. 6 is a simplified schematic diagram of a conventional driver and receiver for a copper communications link.

In the following example of an embodiment of the invention, as described in conjunction with FIGS. 7 and 8, a commercial HDMI 1.3a copper link 15 is used as a starting point. The open collector driver is one of the most common methods of driving signal across a copper link. It is widely used in existing copper interconnect standards such as HDMI, DVI, and PCIe. It is also the most common driving method in chip-to-chip interconnects. In FIG. 6, a prior art single ended connection is shown to demonstrate how signal is conventionally transferred from the driver end to the receiver end. In FIG. 6, the driver includes transistor 615 and a current source 620 in the emitter circuit thereof. The data signal ("1" or "0") is applied to the transistor base, and the transistor collector is coupled with the copper cable. At the receiver, the signal is converted, using a resistive component represented by R, to a voltage representative of either "0" ($=V_{cc}$) or "1" ($=V_{cc}-IR$). A pair of such single ended connections is used to form a differential pair (described further hereinbelow), for a conventional copper channel. For the HDMI standard, Vcc is generally 3.3 Volts. HDMI contains four high speed copper channels.

Figure 7:
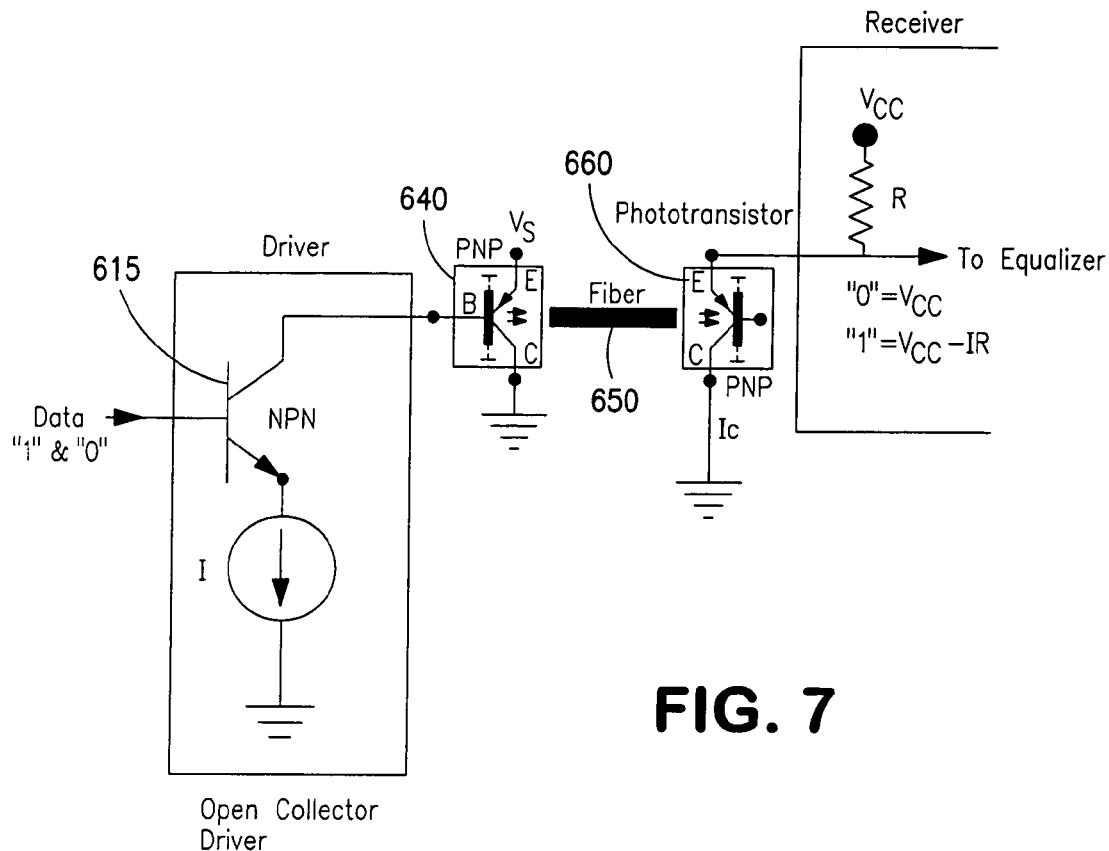
FIG. 7 is a schematic diagram of a fiber optical communications link in accordance with an embodiment of the invention.

FIG. 7 illustrates how a tilted charge light emitting transistor and a photoreceiver such as a phototransistor may be used to directly replace a copper channel based on an open collector copper driver, as used in a HDMI 1.3a standard. In FIG. 7, the driver and receiver are the same as was shown for the copper channel of FIG. 6. The transistor 615 of this example is an NPN transistor. A tilted charge light-emitting device 640 is advantageously employed as an electro-optical converter. In the illustrated embodiment, the tilted charge light-emitting device 640 is a PNP light-emitting transistor, which may be, for example, of the type disclosed in U.S. Pat. No. 7,535,034, of G. Walter, et al. The driver input is coupled with the base terminal of the light-emitting transistor 640. The emitter thereof is biased with voltage $V_s$, and the emitted light is coupled into optical fiber link 650, which replaces the copper cable. The voltage ($V_s$) required to power the tilted charge device can be directly connected to the +5 V power supply, provided by the HDMI transmitter chipset. At the receiver end, in this embodiment, a PNP phototransistor 660 operates to convert the optical signal to an electrical signal. The phototransistor is powered directly by the same Vcc that powered the copper link. In this example, the optical link utilizes only one of the two available copper connections that form a copper channel. The other copper connection may be left unconnected or be used to power the tilted charge light emitting transistor.

Figure 8:
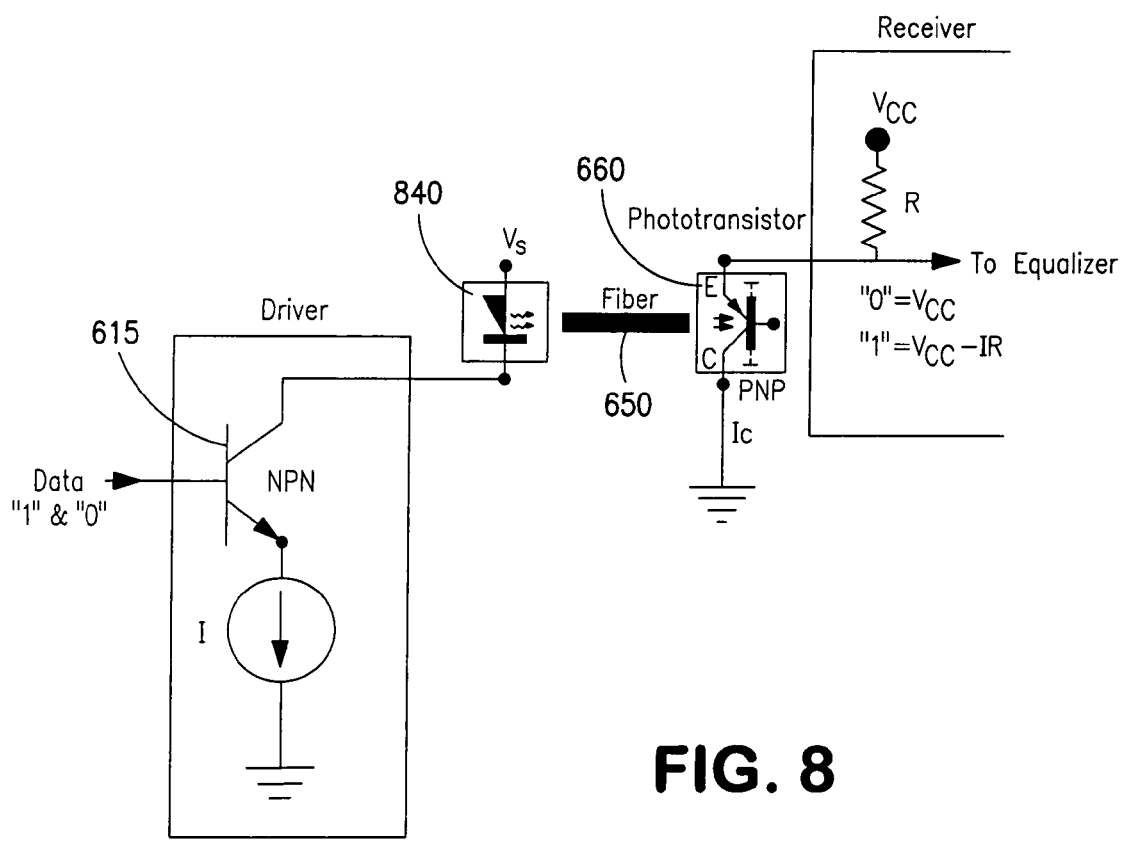
FIG. 8 is a schematic diagram of a fiber optical communications link in accordance with another embodiment of the invention.

In the embodiment of FIG. 8, the tilted charge light-emitting device used for electro-optical conversion is a tilted charge light-emitting diode, which may, for example, be of the type disclosed in U.S. Patent Application Publication No. US2010/0202483 of G. Walter, et al. As before, the tilted charge device, optical fiber, and a photoreceiver such as a phototransistor can be used to directly replace a copper channel based on an open collector copper driver, as used in a HDMI 1.3a standard. Also as before, the voltage ($V_s$) required to power the tilted charge device can be directly connected to the +5 V power supply, provided by the HDMI transmitter chipset.

The described high speed optical data link can be used for both simplex (one way) and duplex (two way) data links. Examples of one way data link application standards are HDMI, DVI, and Displayport. Examples of two way data link application standards are Infiniband, Fiber Channel, Gigabit Ethernet, USB, XAUI, PCI-e, SAS, SATA. For two way communication there will be, at each end, a pair or a plurality of pairs of transmitter and receiver.

Figure 9:
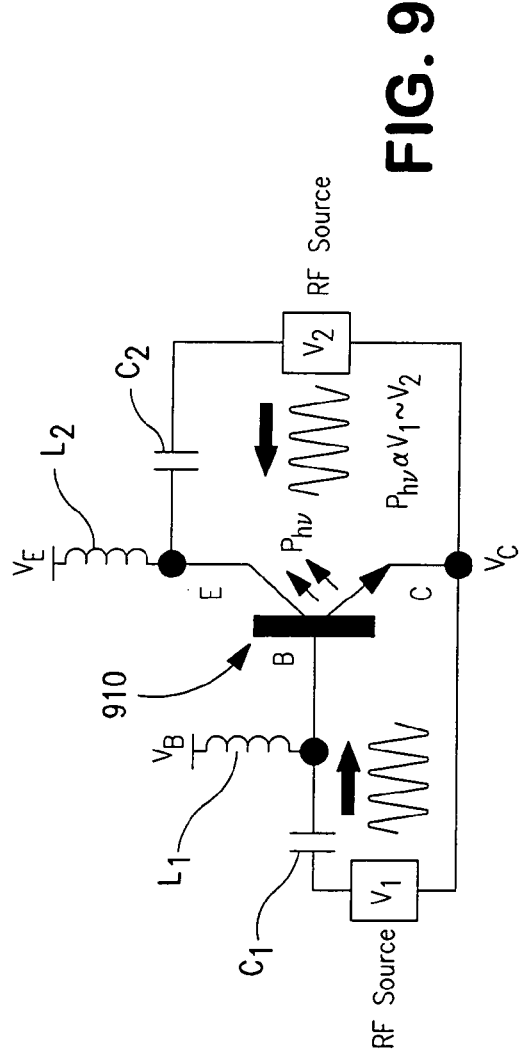
FIG. 9 is a schematic diagram of a light emitting transistor and associated circuitry configured for use in an embodiment of the invention.

A further aspect of the invention involves a unique electro-optical communication technique that utilizes an electrical to optical voltage differentiator. FIG. 9 is a diagram of a tilted charge light emitting device in the form of an NPN light-emitting transistor (see the above-referenced patent and publication documents). As shown in the diagram, the device is in a common collector configuration, with an RF source $V_1$ applied to the base-collector input port and an RF source $V_2$ applied to the emitter-collector input port. The RF signal $V_1$ is applied via capacitor $C_1$ and the RF signal $V_2$ is applied via capacitor $C_2$. The base is biased with voltage $V_B$ via inductor $L_1$ and the emitter is biased with voltage $V_E$ via inductor $L_2$.

When both electrical ports (BC port and EC port) of a common collector tilted charge device are fed with respective RF signals, the output optical signal ($P_{hv}$) is proportional to the difference of the two input signal voltages. When biased as shown, the common collector tilted charge device operates as an electrical to optical voltage differentiator. If $V_2$ is characterized so that it is 180° out-of-phase with $V_1$, then the resulting $P_{hv} \propto |V_1| + |V_2|$. In the configuration of FIG. 9, the NPN tilted charge device is biased where $V_B - V_E (V_{BE})$ is larger than the junction turn on voltage and where $V_B - V_C$ ($V_{BC}$) is less than the turn on voltage of the $V_{BC}$ junction.

Figure 10:
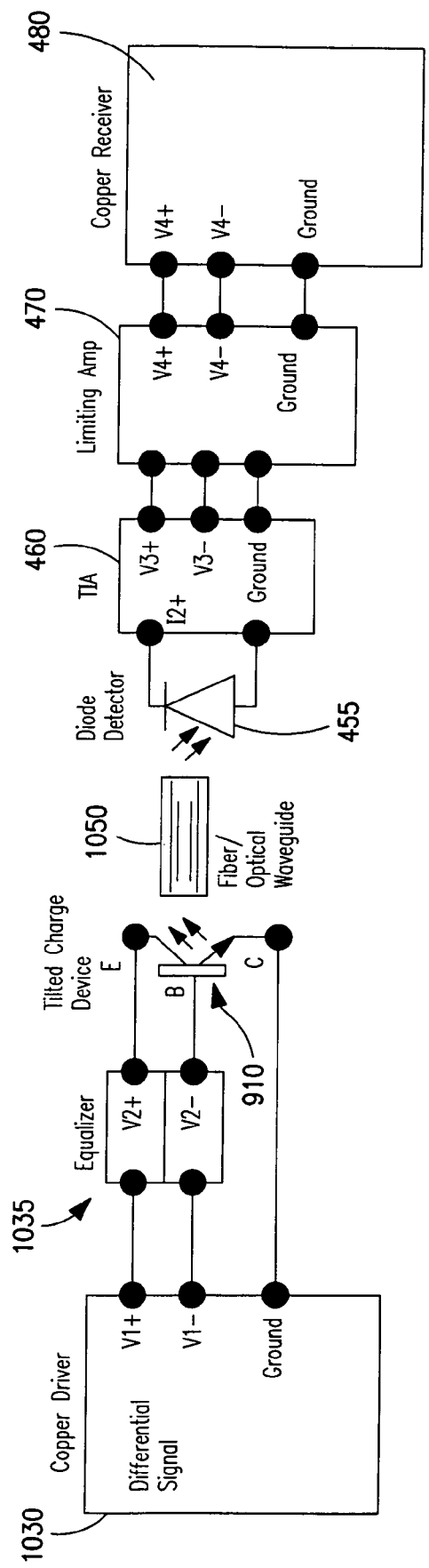
FIG. 10 is a schematic diagram, partially in block form, of a fiber optical communications system using differential signaling, in accordance with an embodiment of the invention.

As described further in conjunction with FIG. 10, a common collector tilted charge device, configured as shown in FIG. 9, simplifies and improves the transmit side of the optical based interconnect. In the FIG. 10 embodiment, the copper driver 1030 is similar to the copper driver 430 of FIG. 4.

Figure 4:
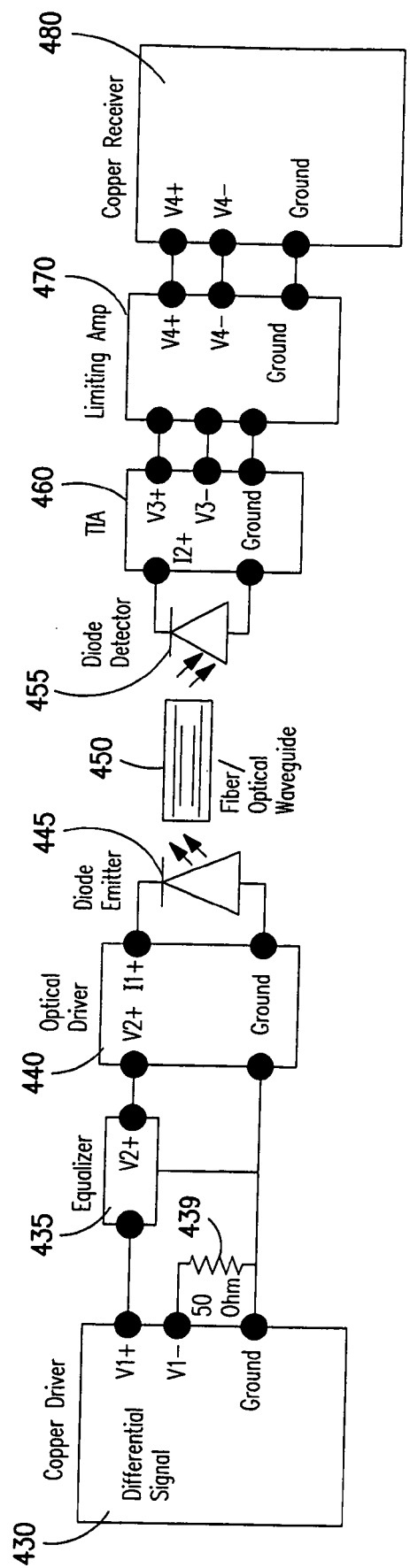
FIG. 4 is a block diagram of an example of a conventional fiber optical communication system using differential signals.

In this case, both of the differential signals V1+ and V1− are equalized using equalizer 1035 (unlike the prior art of FIG. 4, where one of the differential signals is discarded). The equalized signals V2− and V2+ are respectively coupled to the base and emitter of light-emitting transistor 910 (i.e., as the inputs $V_1$ and $V_2$ of the device as configured and biased in the FIG. 9 description) to obtain an optical output signal. After this stage, the system is similar to the prior art system of FIG. 4; namely, including diode detector 455, transimpedance amplifier 460, limiting amplifier 470, and copper receiver 480. There are important advantages to the embodiment of FIG. 10. First, it allows up to two times larger voltage swing in the tilted charge device than was available for light emitting diode 445 of the prior art technique of FIG. 4. This is advantageous when the input signal (V1+) is fixed and operating the device single-ended does not provide the desired voltage swing, and is particularly useful in when driving a low impedance device, such as a transistor laser. (The three terminal tilted charge device can alternatively be a transistor laser.) Secondly, two separate equalizers with independent characteristics can optionally be applied to V1+ and V1−, resulting in a customizable voltage difference into the tilted charge device. For example, for one channel, the equalizer maybe characterized as a low pass filter, and the second equalizer may be characterized as a high pass filter. (As used in this context, filtering can mean attenuation and/or amplification of selected frequency bands.) The resulting optical output will exhibit higher bandwidth. Also, a spontaneous device tilted charge device which has a 20 dB/decade slope can be advantageous when coupled with a high pass equalizer to achieve efficiency-bandwidth tradeoff which trades off RF optical output efficiency with optical bandwidth.

Figure 11:
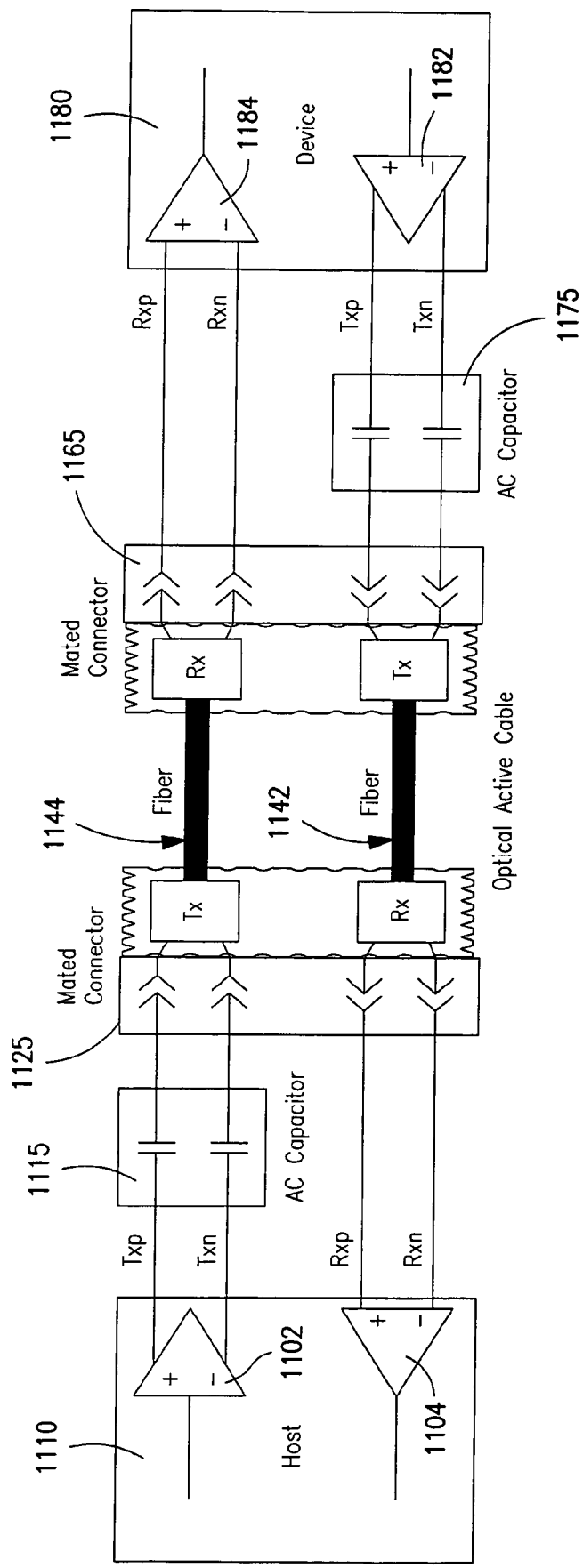
FIG. 11 is a schematic diagram, partially in block form, of a duplex fiber optical communication link employing an embodiment of the invention.

FIG. 11 shows how a so-called SuperSpeed component of USB 3.0, which consists of two half-duplex links, can be modified using the techniques hereof to replace the usual copper cable components that are coupled between connectors of a host and a device. The host 110 includes transmitter amplifier 1102 and receiver amplifier 1104, and the device includes transmitter amplifier 1182 and receiver amplifier 1184. The respective transmitter outputs are capacitively coupled (blocks 1115 and 1175) with connectors 1125 and 1165, which also couple the received signals to the respective receiver amplifiers. However, instead of the usual copper cable components, two fiber optical active cable subsystems, of the types herein described, with associated transmitters utilizing tilted charge devices, are employed to advantage. The resultant improvements in efficiency of operation and long term cost savings, as have been described above, will be evident for this and other applications.

The invention has been described with reference to particular preferred embodiments, but variations within the spirit and scope of the invention will occur to those skilled in the art. For example, while the illustrated embodiments have described primarily employment of tilted charge light emitting diodes and light emitting transistors, laser versions of these devices (tilted charge laser diodes and transistor lasers) can alternatively be employed, where appropriate.

The invention claimed is:

1. A method for high speed communication of input information, comprising the steps of:
   producing a pair of phase-opposed electrical signals representative of said input information;
   providing a three terminal tilted-charge light-emitting device in a common collector configuration;
   applying one of said phase-opposed signals to a base-collector input of said tilted charge light-emitting device and the other of said phase opposed signals to an emitter-collector input of said tilted charge light-emitting device, to produce an optical signal as a function of both of said phase-opposed signals;
   communicating said optical signal to a receiving location; and
   receiving said optical signal at said receiving location and converting said optical signal to an output electrical signal representative of said input information.

2. The method as defined by claim 1, wherein said optical signal, which is a function of both of said phase-opposed signals, is proportional to the sum of the absolute values of the phase-opposed signals.

3. The method as defined by claim 1, wherein said step of providing a three terminal tilted-charge light-emitting device comprises providing a light-emitting transistor.

4. The method as defined by claim 1, wherein said step of providing a three terminal tilted-charge light-emitting device comprises providing a transistor laser.

5. The method as defined by claim 1, wherein said step of communicating said optical signal to a receiving location comprises communicating said optical signal over a fiber optical waveguide.

6. The method as defined by claim 1, further comprising the step of applying first and second equalizer functions to respective ones of said pair of phase-opposed electrical signals before applying said phase-opposed signals to said tilted charge light-emitting device.

7. The method as defined by claim 6, wherein said step of applying said first equalizer function includes applying a first type of frequency filtering, and said step of applying said second equalizer function includes applying a second type of frequency filtering that is different than said first type of frequency filtering.

8. The method as defined by claim 7, wherein said first type of frequency filtering comprises low pass filtering and said second type of frequency filtering comprises high pass filtering.

9. For use in a system for high speed communication wherein an input electrical signal comprising a pair of phase-opposed signals representative of input information is converted to an optical signal that is communicated to a receiving location and converted to an output electrical signal representative of said input information; a method for converting said input electrical signal into said optical signal, comprising the steps of:
   providing a three terminal tilted-charge light-emitting device in a common collector configuration; and
   applying one of said phase-opposed inputs signals to a base-collector input of said tilted charge light-emitting device and the other of said phase-opposed signals to an emitter-collector input of said tilted charge light-emitting device, to produce an optical signal as a function of both of said phase-opposed signals.

10. The method as defined by claim 9, wherein said optical signal, which is a function of both of said phase-opposed signals, is proportional to the sum of the absolute values of the phase-opposed signals.

11. The method as defined by claim 9, wherein said step of providing a three terminal tilted-charge light-emitting device comprises providing a light-emitting transistor.

12. The method as defined by claim 9, wherein said step of providing a three terminal tilted-charge light-emitting device comprises providing a transistor laser.

13. The method as defined by claim 9, further comprising the step of applying first and second equalizer functions to respective ones of said pair of phase-opposed electrical signals before applying said phase-opposed signals to said tilted charge light-emitting device.

14. The method as defined by claim 13, wherein said step of applying said first equalizer function includes applying a first type of frequency filtering, and said step of applying said second equalizer function includes applying a second type of frequency filtering that is different than said first type of frequency filtering.

15. The method as defined by claim 14, wherein said first type of frequency filtering comprises low pass filtering and said second type of frequency filtering comprises high pass filtering.

16. The method as defined by claim 3, further comprising the step of applying first and second equalizer functions to respective ones of said pair of phase-opposed electrical signals before applying said phase-opposed signals to said light-emitting transistor.

17. The method as defined by claim 16, wherein said step of applying said first equalizer function includes applying a first type of frequency filtering, and said step of applying said second equalizer function includes applying a second type of frequency filtering that is different than said first type of frequency filtering.

18. The method as defined by claim 17, wherein said first type of frequency filtering comprises low pass filtering and said second type of frequency filtering comprises high pass filtering.

19. The method as defined by claim 11, further comprising the step of applying first and second equalizer functions to respective ones of said pair of phase-opposed electrical signals before applying said phase-opposed signals to said light-emitting transistor.

20. The method as defined by claim 19, wherein said step of applying said first equalizer function includes applying a first type of frequency filtering, and said step of applying said second equalizer function includes applying a second type of frequency filtering that is different than said first type of frequency filtering.

21. The method as defined by claim 20, wherein said first type of frequency filtering comprises low pass filtering and said second type of frequency filtering comprises high pass filtering.

* * * * *